United States Patent
Hebert

[11] Patent Number: 5,280,867
[45] Date of Patent: Jan. 25, 1994

[54] CONCRETE HANGER ORGANIZATION

[76] Inventor: Kevin J. Hebert, 3918 Hickory Rd., Richmond, Va. 23235

[21] Appl. No.: 837,942

[22] Filed: Feb. 20, 1992

[51] Int. Cl.$^5$ .............................................. F16M 11/00
[52] U.S. Cl. ....................................... 248/200; 52/78; 52/704
[58] Field of Search ...................... 248/58, 200; 52/39, 52/125.5, 295, 309.16, 565, 704, 705

[56] References Cited

U.S. PATENT DOCUMENTS

| | | | |
|---|---|---|---|
| 941,714 | 11/1909 | Jenckes | 248/58 X |
| 1,072,361 | 9/1913 | Rickman | 248/58 X |
| 2,860,504 | 11/1958 | Sinner | 52/704 X |
| 3,418,781 | 12/1968 | Penote | 52/704 X |
| 3,420,013 | 1/1969 | Alvarado | 52/704 X |
| 3,785,598 | 1/1974 | Gillstrap | 248/58 |

FOREIGN PATENT DOCUMENTS 3329374  2/1985  Fed. Rep. of Germany ..... 52/125.5

Primary Examiner—J. Franklin Foss
Attorney, Agent, or Firm—Leon Gilden

[57] ABSTRACT

A concrete slab is arranged to be provided with threaded bores, or alternatively internally threaded anchor plugs directed into the concrete slab. A plurality of hanger members are arranged for reception within spaced bores, wherein each hanger member includes a first and second support rod threadedly directed into the bores, with a connecting rod slidably received through the second rod and threadedly received within the first rod orthogonally oriented relative to the first and second support rods.

2 Claims, 4 Drawing Sheets

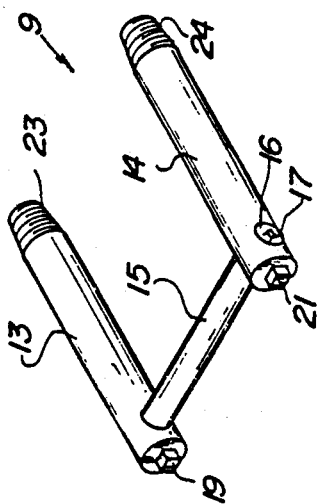
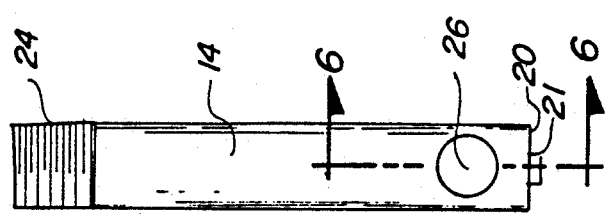
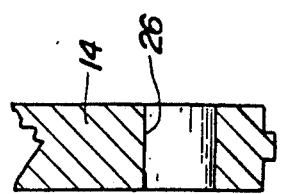
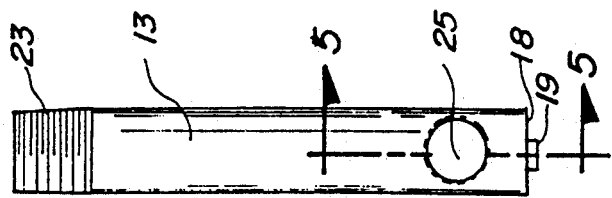
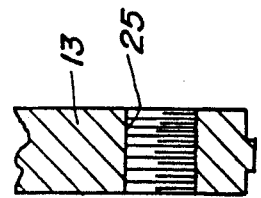
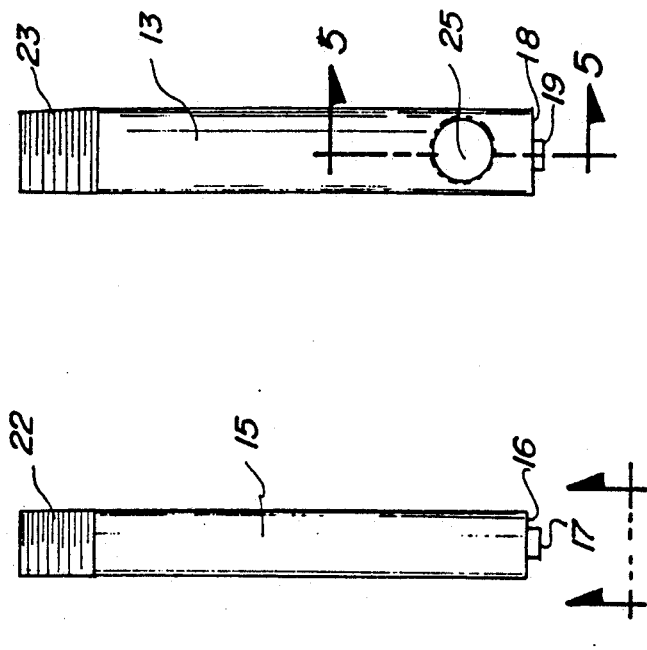
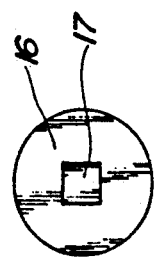

CONCRETE HANGER ORGANIZATION

BACKGROUND OF THE INVENTION

1. Field of the Invention

The field of invention relates to hanger structure, and more particularly pertains to a new and improved concrete hanger organization arranged in cooperation with a concrete slab or vault to direct conduit and pipe members between the hanger members and the slab.

2. Description of the Prior Art

While the prior art has addressed the use of hanger structure within a concrete structure, the instant invention attempts to provide for readily positionable hanger sensor members within a concrete vault or slab that are retrofitted thereto in a precast concrete slab for mounting the hanger sets thereto. The prior art has heretofore failed to provide for such retrofit hanger structure to accommodate various conduit and pipes directed into the concrete vault or through the concrete slab structure.

Accordingly, there remains a need for a new and improved concrete hanger organization as set forth by the instant invention which addresses both the problems of ease of use as well as effectiveness in construction and this respect, the present invention substantially fulfills this need.

SUMMARY OF THE INVENTION

In view of the foregoing disadvantages inherent in the known types of concrete hanger apparatus now present in the prior art, the present invention provides a concrete hanger organization wherein the same is arranged to secure and position conduit and the like directed between the apparatus and an associated concrete slab structure. As such, the general purpose of the present invention, which will be described subsequently in greater detail, is to provide a new and improved concrete hanger apparatus which has all the advantages of the prior art concrete hanger organization and none of the disadvantages.

To attain this, the present invention provides a concrete slab arranged to be provided with threaded bores, or alternatively internally threaded anchor plugs directed into the concrete slab. A plurality of hanger members are arranged for reception within spaced bores, wherein each hanger member includes a first and second support rod threadedly directed into the bores, with a connecting rod slidably received through the second rod and threadedly received within the first rod orthogonally oriented relative to the first and second support rods.

My invention resides not in any one of these features per se. but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved concrete hanger organization which has all the advantages of the prior art concrete hanger apparatus and none of the disadvantages.

It is another object of the present invention to provide a new and improved concrete hanger organization which may be easily and efficiently manufactured and marketed.

It is a further object of the present invention to provide a new and improved concrete hanger organization which is of a durable and reliable construction.

An even further object of the present invention is to provide a new and improved concrete hanger organization which is susceptible of a low cost of manufacture with regard to both materials and labor, and which accordingly is then susceptible of low prices of sale to the consuming public, thereby making such concrete hanger organizations economically available to the buying public.

Still yet another object of the present invention is to provide a new and improved concrete hanger organization which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of a connecting rod utilized by the invention.

FIG. 2 is an orthographic view of the first support rod utilized by the invention.

FIG. 3 is an orthographic view of the second support rod utilized by the invention.

FIG. 4 is an orthographic view, taken along the lines 4—4 of FIG. 1 in the direction indicated by the arrows.

FIG. 5 is an orthographic view, taken along the lines 5—5 of FIG. 2 in the direction indicated by the arrows.

FIG. 6 is an orthographic view, taken along the lines 6—6 of FIG. 3 in the direction indicated by the arrows.

FIG. 14 is an isometric illustration of a further configuration of the hanger set.

DESCRIPTION OF THE PREFERRED EMBODIMENT

Figure 9:
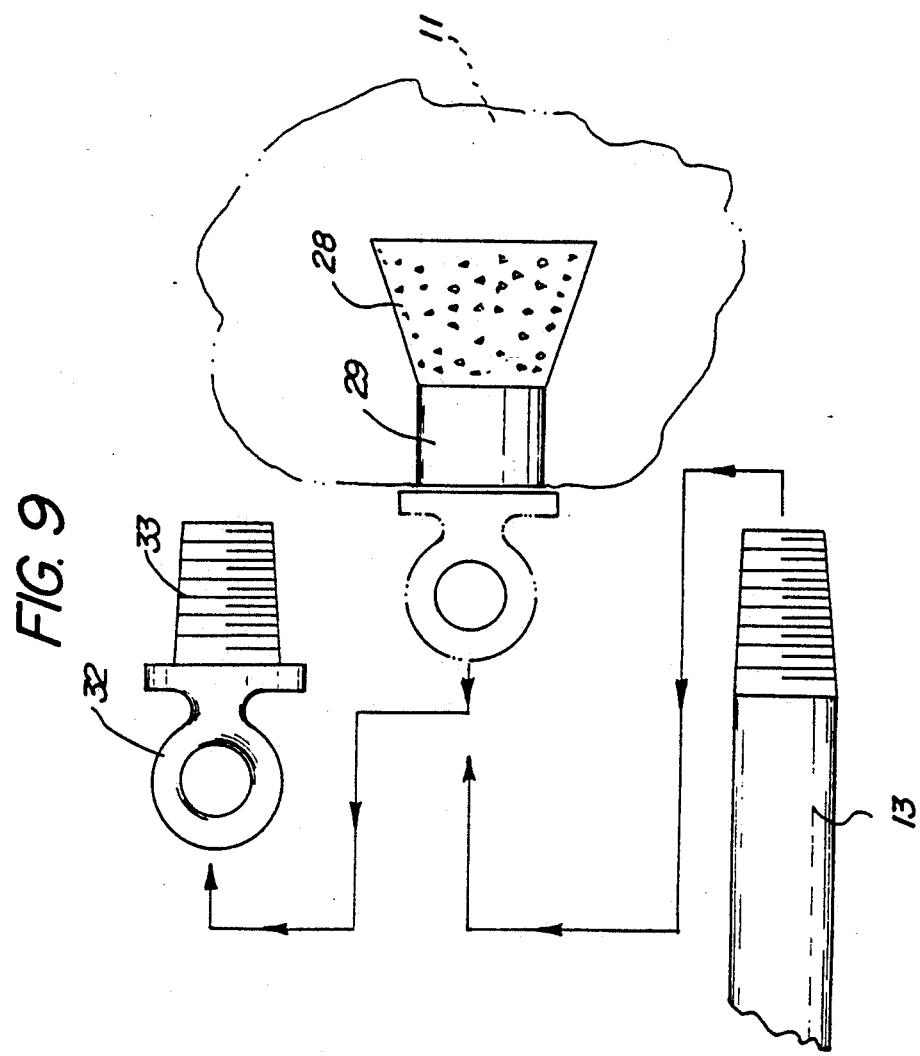
FIG. 9 is an orthographic view of the slab anchor for selective use with an associated hanger ring lower support rod of the invention.
Figure 7:
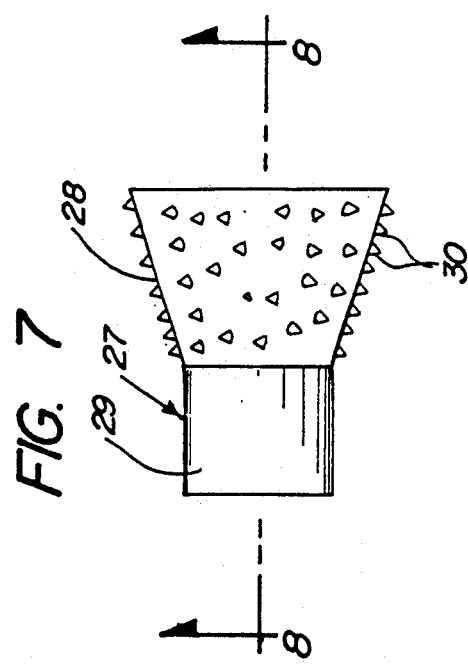
FIG. 7 is an orthographic view of a slab anchor utilized by the invention.
Figure 8:
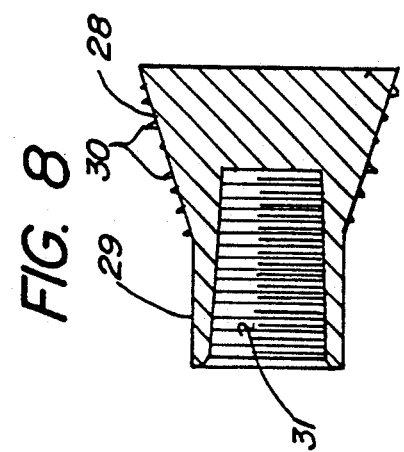
FIG. 8 is an orthographic view, taken along the lines 8—8 of FIG. 7 in the direction indicated by the arrows.

With reference now to the drawings, and in particular to FIGS. 1 to 13 thereof, a new and improved concrete hanger organization embodying the principles and concepts of the present invention and generally designated by the reference numeral 10 will be described.

Figure 10:
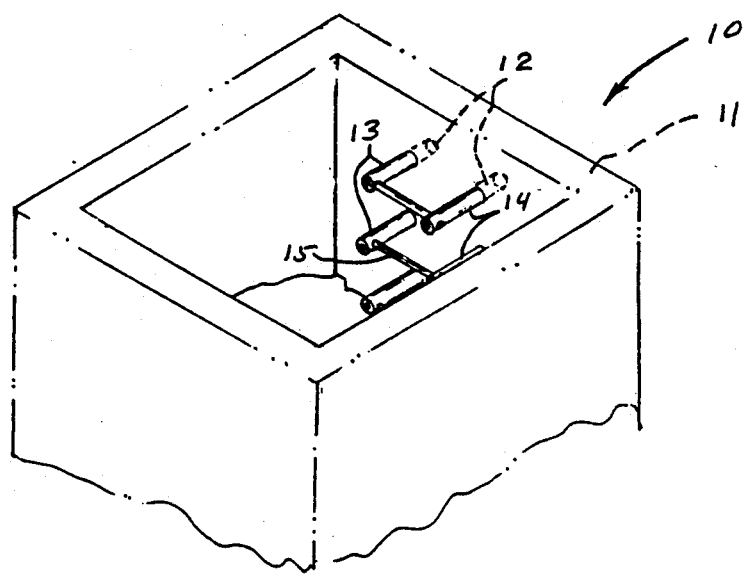
FIG. 10 is an isometric illustration of the hanger sets in use.
Figure 11:
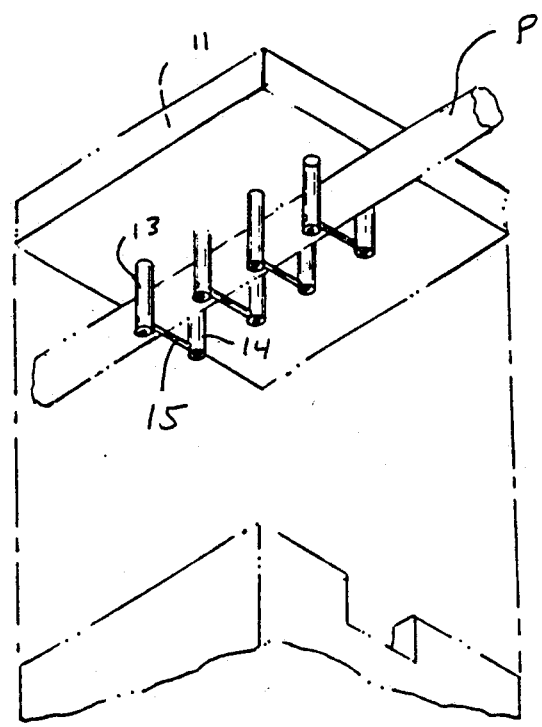
FIG. 11 is an isometric illustration of a further configuration of the hanger sets in use.
Figure 12:
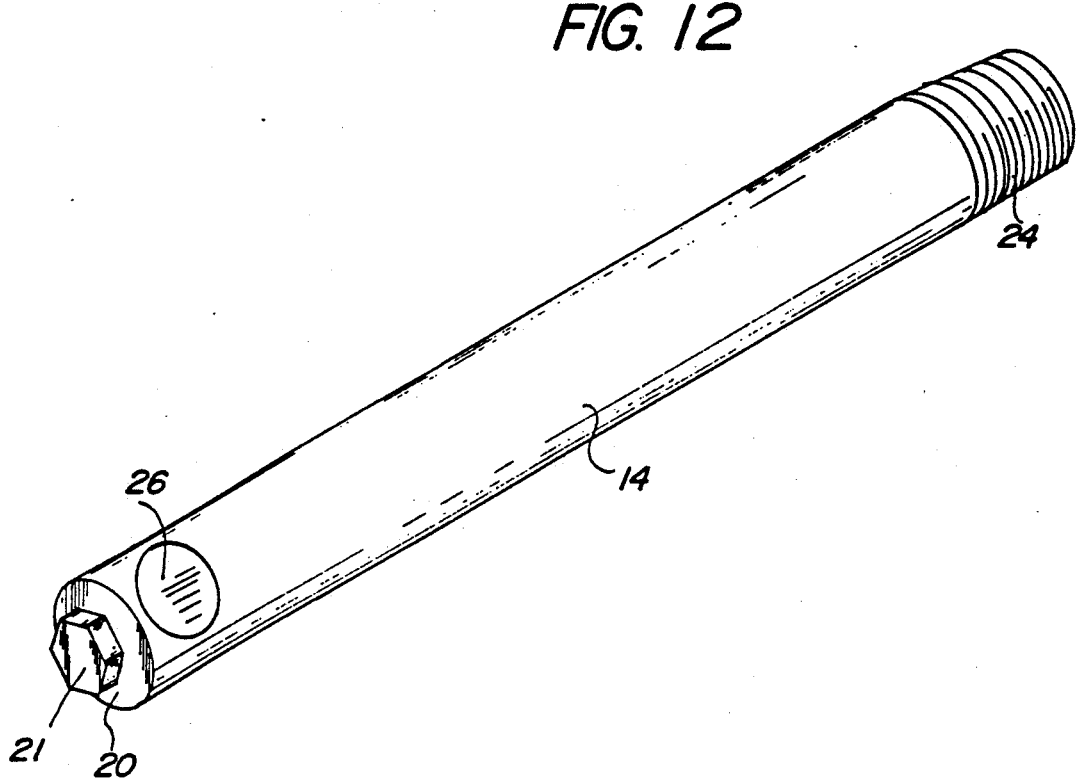
FIG. 12 is an isometric illustration of a modified support rod structure of the invention.

More specifically, the concrete hanger organization 10, such as illustrated in the FIGS. 10 and 11, is arranged for cooperation with a concrete slab 11 that includes plural pairs of adjacent threaded slab bores 12. The threaded slab bores may be utilized with slab anchors 27, such as illustrated in the FIGS. 7 and 8, wherein the slab anchors each include a truncated conical base portion 28 in a coaxially aligned cylindrical head 29 at a forward end of the base portions 28. Each cylindrical head 29 includes a head internally threaded bore 31 defined by a first diameter. The base portion 28 includes base portion projections 30 to fixedly secure each of the slab anchors 27 and prevent their rotation when cast within the concrete slab 11 to provide for the threaded bores 31 to be positioned in plural pairs The hanger utilized by the invention indicated by the numeral 9 include a first support rod 13 defined by the first diameter arranged in a spaced parallel relationship to a second support rod 14. A connecting rod 15 defined by a second diameter less than the first diameter is orthogonally directed and mounted to the first support rod 13, and slidably received through the second support rod 14. The connecting rod 15 includes a connecting rod rear end wall 16 orthogonally oriented relative to the connecting rod 15 and a connecting rod axis defined thereby. The connecting rod rear end wall 16 includes a connecting rod rear end wall wrench receiving boss 17 projecting coaxially and exteriorly of the rear end wall 16. The support rod 13 includes a first support rod rear end wall 18 and a first support rear end wall wrench receiving boss 19 integrally mounted to the first support rod rear end wall 18 coaxially aligned relative to the first support rod axis defined by the cylindrical first support rod. The cylindrical second support rod 14 includes a second support rod rear end wall 20, with the second support rod wrench receiving boss 21 projecting rearwardly and coaxially relative to the second support rod 14. It should be noted the wrench receiving bosses 17, 19, and 21 may be configured of a hexagonal configuration such as indicated in the FIG. 12 to accommodate temporary tools, such as sockets and the like, for their securement to the concrete slab 11. The connecting rod includes a connecting rod externally threaded forward end 22 that is arranged for threaded reception within a first support rod internally threaded bore 25 defined by the second diameter and orthogonally oriented relative to the axis of the first support rod 13 to threadedly receive the connecting rod's externally threaded forward end 22 therewithin. The second rod includes a second rod smooth wall bore 26 defined by the second diameter orthogonally oriented relative to the axis of the second rod 14 to slidably receive the connecting rod therethrough permitting sliding reception of the connecting rod through the second support rod in its threaded engagement within the first support rod. Further, the first rod internally threaded bore 25 and the second rod smooth wall bore 26 are arranged for coaxial alignment in a spaced relationship to properly receive the connecting rod 15. The first and second support rod 13 and 14 include the first and second support rods externally threaded forward ends 23 and 24 to be received within the concrete slab's threaded bores 12, such as illustrated in the FIG. 10 for example, or within the slab anchor's head internally threaded bore 31 that are precast into the concrete slab. It should be noted that conical (as shown) or cylindrical threading may be utilized.

Figure 13:
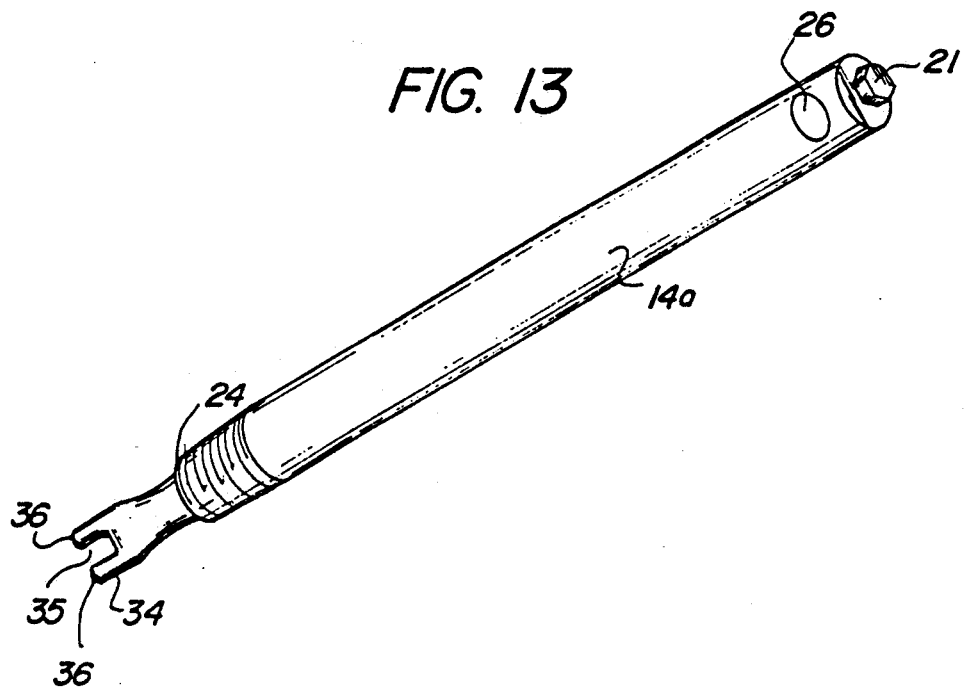
FIG. 13 is an isometric direct illustration of a yet further modified support rod structure of the invention.

At least one of the support rods, such as the modified second support rod 14a, may be provided with a bifurcated forward edge extension 34 defined by a boss receiving gap 35 defined by the parallel legs 36 of the extension 34 to provide for a convenient wrench structure in mounting of the support rods into the concrete slab. As extra support rods are utilized in the mounting of plural sets of such structure, the availability of extras are provided. Alternatively, the connecting rod defined by a second diameter may be thusly constructed, such as illustrated in FIG. 13, to permit the bifurcated forward end extension 34 to project beyond the first support rod when the connecting rod is secured within the first support rod.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A concrete hanger organization arranged for securement to a concrete slab, wherein the concrete slab includes plural pairs of threaded bores, each pair of threaded bores spaced apart a predetermined spacing, and wherein the hanger organization comprises, a first support rod defined by a first diameter of a cylindrical configuration along a first axis, and a second support rod defined by the first diameter of a cylindrical configuration defined about a second axis, and a connecting rod orthogonally mounted to the first support rod and the second support rod defined by a second diameter less than the first diameter, wherein the first support rod and the second support rod include a respective first rod externally threaded forward end and a second rod externally threaded forward end respectively, wherein the first rod externally threaded forward end and the second rod externally threaded forward end are arranged for reception within one of said pairs of threaded bores, and each threaded bore of said pairs of threaded bores is positioned within a cylindrical head, each cylindrical head includes a truncated conical base portion, the truncated conical base portion is coaxially aligned with the cylindrical head and the base portion includes a matrix of base portion projections directed exteriorly of the base portion secured within the concrete slab preventing rotation of the cylindrical head relative to the concrete slab, and the first support rod includes a first rod rear end wall, the second support rod includes a second rod rear end wall, the first rod rear end wall includes a first wrench rod integrally mounted to the first rod rear end wall, the second rod rear end wall includes a second rod wrench receiving boss fixedly and co-axially mounted to the second rear end wall, and the first support rod includes a rod internally threaded bore defined by the second diameter orthogonally oriented relative to the first axis, and the second rod includes a second rod smooth wall bore defined by the second diameter orthogonally oriented relative to the second axis, and the connecting rod includes a connecting rod externally threaded forward end threadedly received within the first rod internally threaded bore, and the second rod slidably received through the second rod smooth wall bore positioned within the second rod smooth wall bore.

2. A concrete hanger organization as set forth in claim 1 wherein the connecting rod includes a connecting rod bifurcated forward end projection coaxially aligned relative to the connecting rod and extending forwardly of the connecting rod, wherein the bifurcated forward end projection includes a boss receiving gap defined between spaced parallel legs of the bifurcated forward end extension.

* * * * *